United States Patent
Warnke et al.

(10) Patent No.: US 12,380,372 B2
(45) Date of Patent: Aug. 5, 2025

(54) CHARGER RESERVATIONS

(71) Applicant: Rivian IP Holdings, LLC, Irvine, CA (US)

(72) Inventors: Trent Warnke, Novi, MI (US); Sara Eslinger, Redwood City, CA (US); Jonathan Glen Colbert, Lakeland, FL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/478,845

(22) Filed: Sep. 29, 2023

(65) Prior Publication Data

US 2025/0111291 A1    Apr. 3, 2025

(51) Int. Cl.
*G06Q 10/02*     (2012.01)
*B60L 58/12*     (2019.01)
*G06Q 50/06*     (2024.01)

(52) U.S. Cl.
CPC .............. *G06Q 10/02* (2013.01); *B60L 58/12* (2019.02); *G06Q 50/06* (2013.01)

(58) Field of Classification Search
CPC ......... G06Q 10/02; G06Q 50/06; B60L 58/12
See application file for complete search history.

(56) References Cited

U.S. PATENT DOCUMENTS

| | | | | |
|---|---|---|---|---|
| 2013/0282472 A1* | 10/2013 | Penilla | .................... | B60L 53/80 705/14.1 |
| 2017/0030728 A1* | 2/2017 | Baglino | ............. | G01C 21/3469 |
| 2017/0146354 A1* | 5/2017 | Boss | .................. | G01C 21/3438 |
| 2018/0202825 A1* | 7/2018 | You | .......................... | G08G 1/20 |
| 2023/0339354 A1* | 10/2023 | Kraeling | ................. | B60L 53/68 |
| 2024/0034170 A1* | 2/2024 | Brannan | ................. | B60L 53/66 |
| 2024/0181917 A1* | 6/2024 | Zhang | .................. | B60L 53/305 |

OTHER PUBLICATIONS

Radu Flocea, Electric Vehicle Smart Charging Reservation Alorithm, 2022, p. 1-5 (Year: 2022).*

* cited by examiner

*Primary Examiner* — Ibrahim N El-Bathy
(74) *Attorney, Agent, or Firm* — Patterson + Sheridan, LLP (57) ABSTRACT

A method for generating a reservation for a vehicle charger is disclosed. The method includes receiving one or more vehicle parameters associated with a vehicle, determining, based on a location of a vehicle charger and the one or more vehicle parameters, that a reservation should be generated for the vehicle charger, generating, for the vehicle, the reservation for the vehicle charger, and causing the vehicle charger to charge the vehicle based on the reservation.

20 Claims, 4 Drawing Sheets

CHARGER RESERVATIONS

INTRODUCTION

Electric vehicle chargers are an important component of the electric vehicle ecosystem. Generally, charging stations operate on a first-come first-serve basis. This model of vehicle charging may negatively impact the user charging experience and may reduce overall utilization of charging stations.

SUMMARY OF THE INVENTION

The present disclosure generally relates to electric vehicle charging, and more specifically, to charger reservations.

In one or more embodiments, a method for generating a reservation for a vehicle charger is disclosed. The method includes receiving one or more vehicle parameters associated with a vehicle, determining, based on a location of a vehicle charger and the one or more vehicle parameters, that a reservation should be generated for the vehicle charger, generating, for the vehicle, the reservation for the vehicle charger, and causing the vehicle charger to charge the vehicle based on the reservation.

In one or more embodiments, a reservation control system is disclosed. The reservation control system includes a memory and at least one processor coupled to the memory. The at least one processor is configured to receive one or more vehicle parameters associated with a vehicle, determine, based on a location of a vehicle charger and the one or more vehicle parameters, that a reservation should be generated for the vehicle charger, generate, for the vehicle, the reservation for the vehicle charger, and causing the vehicle charger to charge the vehicle based on the reservation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Electric vehicle chargers are an important component of the electric vehicle ecosystem. Generally, charging stations do not permit reservations for vehicles needing to be recharged and operate on a first-come first-serve basis. This model of vehicle charging may negatively impact the user charging experience and may reduce overall utilization of charging stations. Certain embodiments described herein provide a more efficient and/or predictable charging experience to a user while also improving charging network utilization.

In particular, certain embodiments relate to techniques for reserving a vehicle charger for an electric vehicle based on various criteria. In general, a technique for reserving a vehicle charger includes receiving one or more parameters associated with a vehicle and determining, based on the one or more parameters, whether a reservation at the charging station should be generated for the vehicle. The one or more parameters may include, for example, a unique identifier associated with the vehicle, a location of the vehicle, a distance from the vehicle to the vehicle charger, a direction of travel of the vehicle, and a battery charge state of the vehicle.

In various embodiments, determining whether a reservation should be generated may depend on whether the vehicle has entered a geo-fence corresponding to the vehicle charger and/or whether the vehicle is within a threshold distance of the vehicle charger. Additionally, or alternatively, determining whether the reservation should be generated may be based on whether the direction of travel of the vehicle is towards the vehicle charger or away from the vehicle charger, and/or based on whether the vehicle's battery charge state is below a threshold battery charge state. Moreover, the determination may be based on vehicle charger availability.

Generating a reservation for the vehicle charger may include transmitting a reservation confirmation to the vehicle. Additionally or alternatively, generating a reservation for the vehicle may include transmitting a reservation option to the vehicle. The reservation option may then be accepted or rejected by a user of the vehicle. In various embodiments, the techniques may include ranking the vehicle relative to other vehicles based on, for example, a distance from the vehicle charger, based on which vehicle will likely arrive at the vehicle charger first, and/or based on a current battery charge state of each vehicle's battery. A reservation for the top ranked vehicle may then be generated.

The aforementioned techniques provide a more efficient and/or predictable charging experience to the user while also improving charging network utilization by allocating vehicle charger usage according various criteria, such as vehicle location and charging needs.

Figure 1A:
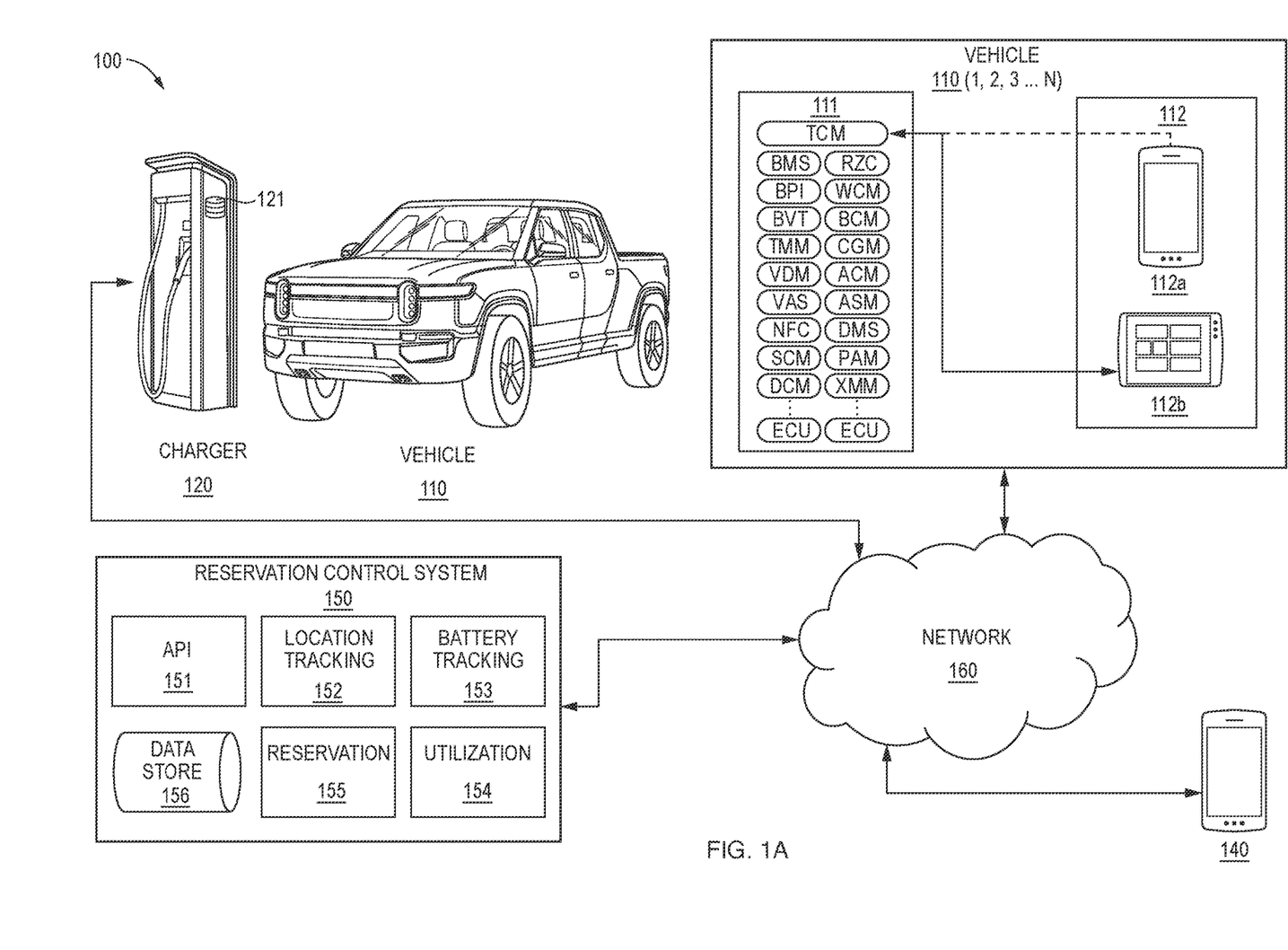
FIG. 1A illustrates an example vehicle charger reservation system, according to certain aspects of the disclosure.

FIG. 1A illustrates an example vehicle charger reservation system 100 (referred to herein as system 100). In general, system 100 can include, without limitation, a vehicle 110-1, vehicle 110-2, vehicle 110-3 . . . vehicle 110-N (collectively referred to as vehicles 110), a vehicle charger 120, a computing device 140 (e.g., a smartphone, a tablet, etc.), and a reservation control system 150 each communicatively coupled to a network 160 (e.g., the Internet). In certain embodiments, the vehicle 110 includes a control system 111 and one or more computing devices 112. In certain embodiments, the computing device(s) 112 can include, without limitation, a smartphone 112a onboard and/or a vehicle control unit 112b. In some embodiments, the computing device 112 may be the computing device 140. In some embodiments, the computing device 112 may be the computing device 140 associated with a specific vehicle 110. For example, the computing device 112 may be associated with the vehicle 110 by hardware integration and/or wireless pairing (e.g., paired via BLUETOOTH). In some embodiments, the computing device 112 may be associated with the vehicle 110 via an application having a login for a user that is in turn associated with the vehicle 110.

In some embodiments, the vehicle 110 is operable to pair with the computing device 112, such as with the smartphone 112a, as illustrated in FIG. 1A. In some embodiments, the computing device 112 can include, without limitation, a tablet computing device, a user headset, a smart vehicle accessory, an in-vehicle display/control unit (e.g., vehicle control unit 112b), and combinations of the same and like. In certain embodiments, the computing device 112 can communicate with, for example, the reservation control system 150 over the network 160. In certain embodiments, the vehicle control unit 112b may be a combination of vehicle systems and displays to provide entertainment (e.g., music), vehicle functionality (e.g., climate controls), and/or vehicle information (e.g., current batter charge state) of the vehicle 110.

Vehicle 110 may include various controllable components (e.g., doors, seats, windows, lights, heating, ventilation and air conditioning (HVAC), an entertainment system, a security system, charging reservation systems, etc.), instrument and information displays and/or interactive interfaces, functionality to pair the computing device 112 with the vehicle 110 (which may enable control of certain vehicle functions using the computing device 112), and functionality to pair accessories with the vehicle, which may then be controllable through an interactive interface in the vehicle 110 (e.g., the vehicle control unit 112b) or through an external interface (e.g., via an application running on the smartphone 112a).

Control system 111 may enable control of various systems on-board the vehicle 110. As shown in FIG. 1A, control system 111 may include one or more Electronic Control Units (ECUs), each of which are dedicated to a specific set of functions. Each ECU may be a computer system (as described further in FIGS. 1B and 1C), and each ECU may include functionality provided by one or more of the example ECUs described below.

In certain embodiments, the control system 111 and/or the computing device 112 transmits information associated with one or more parameters of the vehicle 110 and/or components of vehicle 110 to, for example, other network entities. In certain embodiments, the control system 111 may transmit a unique identifier associated with the vehicle 110, a location of the vehicle 110, a direction of travel associated with the vehicle 110, a destination of the vehicle 110, a speed of the vehicle 110, and/or a battery charge state of the vehicle 110 to a remote processing system, for example, the reservation control system 150 illustrated in FIG. 1A.

In some embodiments, information associated with one or more parameters of the vehicle 110 and/or components of vehicle 110 may be transmitted by a Telematics Control Module (TCM) ECU. In various embodiments, the TCM ECU may provide a wireless vehicle communication gateway to support functionality such as, by way of example and not limitation, over-the-air (OTA) software updates, communication between the vehicle 110 and the network 160 (e.g., the Internet), communication between the vehicle 110 and the computing device 112, in-vehicle navigation, vehicle-to-vehicle communication, communication between the vehicle 110 and landscape features (e.g., automated toll road sensors, automated toll gates, power dispensers at charging stations, such as, the vehicle charger 120), or automated calling functionality.

In various embodiments, the TCM ECU transmits information associated with one or more parameters of the vehicle 110 and/or components of vehicle 110, as described above. In addition, the TCM ECU may transmit various measurements (e.g., sensor measurements) associated with a vehicle component to a vehicle data analysis system. In some embodiments, the TCM ECU transmits additional information associated with operation of vehicle 110.

Features of embodiments as described herein may be controlled by a Central Gateway Module (CGM) ECU. The CGM ECU may serve as the vehicle's communications hub that connects and transfers data to and from the various ECUs, sensors, cameras, motors, a battery pack, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode, etc.), and thereby control certain vehicle components related to placing the vehicle in one of the vehicle modes. In some embodiments, for electric vehicles, the CGM ECU may also control the vehicle charge port door and related light(s) and/or sensor(s).

In various embodiments, the CGM ECU collects sensor signals from one or more sensors of vehicle 110. For example, the CGM ECU may collect Global Positioning System (GPS) coordinates from a GPS sensor and/or information about the battery charge state of the battery of the vehicle 110 for transmittal to a remote processing system, such as, for example, the reservation control system 150 via the TCM ECU. In various embodiments, the CGM ECU collects signals associated with a user's operation of the vehicle 110. For example, the CGM ECU may record speed, destination, travel direction, and/or the like of the vehicle 110 for transmittal to a remote processing system, such as, for example, the reservation control system 150 via the TCM ECU.

Vehicle 110 may include one or more additional ECUs, such as, by way of example and not limitation, a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 110 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

In various embodiments, vehicle 110 can include any type of electric vehicle that may require charging. In some embodiments, vehicle 110 can communicate with the reservation control system 150 over the network 160 by utilizing an Application Programming Interface (API) 151 of the reservation control system 150. In this manner, the reservation control system 150 can communicate with various makes and models of electric vehicles, which may operate in a manner different from vehicle 110.

As illustrated in FIG. 1A, the system 100 includes one or more vehicle charger(s) 120. While reference is made to a vehicle charger 120 herein, it is to be understood that the vehicle charger 120 can also refer to one or more vehicle charger(s) 120 (e.g., a plurality of vehicle chargers 120) and is thus not limited to a single vehicle charger 120. In certain embodiments, the vehicle charger 120 may be located at a public charging station which allows electric vehicles to be charged In general, charging stations can include, for example, power cabinets that include a Power Electronic Module (PEM) that can perform Alternating Current-Direct Current (AC-DC) conversion, DC-DC conversion, and combinations of the same and like. In certain embodiments, the PEM can operate as a standalone supply (e.g., 50 kW DC) or connected to other PEMs for charging (e.g., 300 kW DC). Additionally, charging stations can include power dispensers to deliver power from the PEM(s) to the vehicle 110. As used herein, the term "vehicle charger" (e.g., the vehicle charger 120) can include one or more of the PEM(s), the power cabinet(s), and/or the power dispenser(s), and may be considered any portion, or combination of portions, of the charging station as discussed above.

In certain embodiments, as illustrated in FIG. 1A, the vehicle charger 120 is communicatively coupled to the network 160 such that the vehicle charger 120 can communicate with, for example, the vehicle 110, the computing device 140, and/or the reservation control system 150. In certain embodiments, the vehicle charger 120 may include a computer system (e.g., as described further in FIG. 1B) for operation of the vehicle charger 120 and can include data 121 stored, for example, within storage 173 as discussed below with respect to FIG. 1B.

In certain embodiments, the data 121 can include various information relating to the vehicle charger 120. For example, the data 121 can include identifying information, such as, a type of charger, a location, a geo-fence of the vehicle charger 120, and/or utilization parameters of the vehicle charger 120. In various embodiments, the type of charger can include, for example, information relating to vehicle compatibility, power output, charger type (e.g., DC fast chargers, regular chargers, etc.), and combinations of the same and like. In some embodiments, the location data can include, without limitation, GPS coordinates, physical addresses, and combinations of the same and like. In some embodiments, the geo-fence data can include a virtual perimeter for a geographic area or location. In certain embodiments, the geo-fence may be dynamically generated (e.g., a radius around the vehicle charger 120) or match a predefined set of boundaries, such as, but not limited to, streets, highways, school zones, neighborhood boundaries, shopping centers, proximity to various locations, and combinations of the same and like. In certain embodiments, the geo-fence can include, for example, a 1 to 100 mile radius around the vehicle charger 120, such as a 1 to 50 mile radius, a 1 to 25 mile radius, a 1 to 10 mile radius, or a 1 to 5 mile radius.

In certain embodiments, the utilization parameters of the vehicle charger 120 can include, without limitation, a status of the vehicle charger 120 (e.g., in use, available, out of service, reserved, etc.). Additionally, the utilization parameters can provide relevant information based on the utilization data. For example, if the vehicle charger 120 is currently in use, a time remaining to complete a charge may be estimated and be stored in the data 121. Furthermore, the utilization parameters can include historical utilization information related to the vehicle charger 120.

In certain embodiments, the data 121 may be stored within the vehicle charger 120 and made available for transmittal to a remote processing system, such as, for example, the reservation control system 150 when a request for the data 121 is received. In some embodiments, the data 121 may be held temporarily and/or transmitted to a remote processing system, such as, for example, the reservation control system 150 in real-time or at specified intervals (e.g., 5, 10, 15, 30, or 60 minutes).

As briefly described above, the system 100 for reservations of a vehicle charger can include a computing device 140. In certain embodiments, the computing device 140 may be a computer system (as described further in FIG. 1B), such as, but not limited to, a smartphone and/or tablet. In some embodiments, the computing device 140 may be a plurality of computing devices 140. In certain embodiments, the computing device 140 can include software and/or applications to communicate with the reservation control system 150 in order to make reservations, identify vehicle charging locations, view utilization of a vehicle charger at a charging station (e.g., the vehicle charger 120), and combinations of the same and like. In some embodiments, the computing device 140 can communicate with the reservation control system 150 over the network 160 by utilizing the API 151.

In certain embodiments, the computing device 140 performs similar functions to that as described above relative to the computing device 112. For example, in some embodiments, the computing device 140 may be connected to, or paired with, a vehicle 110 to interface with the reservation control system 150 over the network 160 utilizing the API 151. In some other embodiments, the computing device 140 does not directly connect to vehicle 110. In certain embodiments, a user may utilize computing device 140 (e.g., at a home or office) on behalf of a driver of vehicle 110. For example, the user may manually request a reservation and/or accept a reservation at the vehicle charger 120 on behalf of the driver even if the user is not currently in the vehicle 110 with the driver. This may allow users who share the vehicle 110 to plan for subsequent trips when each user does not know future plans of the other user for the vehicle 110. Additionally and/or alternatively, in certain embodiments, if the vehicle charger 120 requires payment, a user utilizing the computing device 140 may reserve and pay for the vehicle charger 120 on behalf of a driver of the vehicle 110. In some embodiments, the computing device 140 includes a standalone application to interact with, for example, the API 151 of the reservation control system 150 and/or vehicle 110.

As shown in FIG. 1A, the reservation control system 150 is communicatively coupled to the network 160 such that the reservation control system 150 can communicate with, for example, the vehicle 110, the vehicle charger 120, and/or the computing device 140. In certain embodiments, the reservation control system 150 may be a part of, or implemented on, a computer system (as described further in FIG. 1B). The reservation control system 150, in general, can include the API 151, a location tracking module 152, a battery tracking module 153, a utilization module 154, and a reservation module 155 stored within data store 156. Data store 156 can include, for example, storage 173 as discussed below with respect to FIG. 1B. In certain embodiments, a module (e.g., the modules of reservation control system 150) may include instructions, data, and/or logic used to execute specific tasks, software instructions, and combinations of the same and like. In certain embodiments, the modules may be incorporated and/or operable to be implemented in the form of firmware, a processor, a microprocessor, and/or an integrated chip.

The reservation control system 150, in certain embodiments, can utilize the API 151 to receive parameters associated with the vehicle 110. In certain embodiments, the control system 111 (e.g., via the TCM ECU) and/or the computing device 112 sends the parameters associated with the vehicle 110 to the reservation control system 150 over the network 160. In certain embodiments, the TCM ECU can communicate with the reservation control system 150 directly. For example, the TCM ECU can utilize the API 151 for the transfer of parameters associated with the vehicle 110 to the reservation control system 150.

In certain other embodiments, the TCM ECU can communicate with the reservation control system 150 utilizing the computing device 112. For example, the smartphone 112a can send the parameters associated with the vehicle 110 to the reservation control system 150 over a cellular network connected to the network 160. Additionally, in certain embodiments, the vehicle control unit 112b can send the parameters associated with the vehicle 110 to the reservation control system 150 over the network 160.

As discussed above, the CGM ECU can communicate with various ECUs (e.g., the BMS ECU) of the control system 111 within the vehicle 110 to acquire parameters associated with the vehicle 110. For example, the CGM ECU can communicate with ECUs of the vehicle 110 to obtain a location of the vehicle 110, a direction of travel associated with the vehicle 110, a battery charge state of the vehicle 110, a destination of the vehicle 110, and/or a speed of the vehicle 110. The vehicle 110 can then utilize the TCM ECU to send the parameters associated with the vehicle 110 to the reservation control system 150 either directly or indirectly as described above utilizing the computing device 112.

In certain embodiments, the vehicle 110 sends the parameters associated with the vehicle 110 to the reservation control system 150 either in real-time or at specific time intervals (e.g., 5, 10, 15, 30, or 60 minutes). In various embodiments, the reservation control system 150 queries the vehicle 110 for the parameters associated with the vehicle 110 in real-time or at specific time intervals (e.g., 5, 10, 15, 30, or 60 minutes). In certain embodiments, once the parameters associated with the vehicle 110 are received, the parameters are stored in data store 156.

As discussed above, the data 121 of the vehicle charger 120 is made available for transmittal to the reservation control system 150 when a request for the data 121 is received from, or the data 121 is transmitted to, the reservation control system 150 in real-time or at specified intervals. The data 121 may be received via the API 151 and stored in the data store 156. In this manner, the reservation control system 150 can process the data 121 related to the vehicle charger 120 in conjunction with the parameters associated with the vehicle 110, as described in greater detail below.

The location tracking module 152 can utilize one or more parameters associated with the vehicle 110 and, for example, data 121 of the vehicle charger 120 to determine a location of the vehicle 110 relative to the vehicle charger 120. For example, the location tracking module 152 can identify whether the vehicle 110 has entered a geo-fence of the vehicle charger 120 and is within a threshold distance from the vehicle charger 120 based on the location of the vehicle 110, based on which the location tracking module 152 can determine that a reservation needs to be generated. In some embodiments, the threshold distance can range from a 1 to 50 mile radius, a 1 to 25 mile radius, a 1 to 10 mile radius, or a 1 to 5 mile radius around the vehicle charger 120.

In certain embodiments, the location tracking module 152 can further utilize parameters associated with the vehicle 110 to determine that the vehicle 110 is headed in a direction towards the vehicle charger 120. For example, if the location tracking module 152 has identified that the vehicle 110 has entered the geo-fence of the vehicle charger 120 and is within the threshold distance of the vehicle charger 120, the location tracking module 152 can identify, based on the parameters associated with the vehicle 110, if the vehicle 110 is headed in a direction towards the vehicle charger 120. If yes, the location tracking module 152 may then determine that a reservation needs to be generated for the vehicle charger 120. However, if the location tracking module 152 determines that the vehicle 110 is not headed towards the vehicle charger 120, or has not entered the geo-fence of the vehicle charger 120, the location tracking module 152 may then determine that a reservation does not need to be generated.

In some embodiments, the location tracking module 152 can utilize parameters associated with the vehicle 110 to determine if a reservation that has been previously generated needs to be canceled. For example, if the location tracking module 152 determines that the vehicle 110 is no longer heading in a direction towards the vehicle charger 120, the location tracking module 152 can determine that the previously created reservation needs to be canceled. In another example, if the location tracking module 152 determines that the distance of the vehicle 110 relative to the vehicle charger 120 has not changed for a threshold period of time and/or a time to reach the vehicle charger 120 has increased, the location tracking module 152 can determine that the vehicle 110 has stopped. In such embodiments, the location tracking module 152 can determine that the previously generated reservation needs to be canceled.

Additionally, in certain embodiments, if the location tracking module 152 identifies that the vehicle 110 has exited the geo-fence of the vehicle charger 120, the location tracking module 152 can determine that a previously generated reservation needs to be canceled. In other certain embodiments, if the location tracking module 152 identifies a change in destination of the vehicle 110 that results in an increase in the distance from the vehicle charger 120 such that the distance between the vehicle 110 and the vehicle charger 120 falls outside the distance threshold distance, the location tracking module 152 can determine that a previously generated reservation needs to be canceled.

The battery tracking module 153 can utilize one or more parameters associated with the vehicle 110 to identify if the vehicle 110 needs to be charged. For example, the battery tracking module 153 can identify that a current battery charge state of the vehicle 110 is below a threshold level, indicating that the vehicle 110 needs to be charged. In certain embodiments, the threshold level can include, for example, a current battery charge state at or below 75%, at or below 50%, at or below 25%, or at or below 10%. In certain embodiments, the threshold level may be a dynamic threshold level that is based on current battery charge state, a destination of the vehicle 110, and/or an estimated battery charge state after the vehicle 110 reaches a destination. In various embodiments, a user of the vehicle 110 can set a preferred threshold level.

The battery tracking module 153, in certain embodiments, can determine an estimated battery charge state of the vehicle 110 based on the current battery charge state of the vehicle 110 and a destination of the vehicle 110 (e.g., as determined by the location tracking module 152). For example, no reservation needs to be generated if the battery tracking module 153 identifies that the vehicle 110 can arrive at the destination without needing to be charged. In another example, if the parameters associated with the vehicle 110 identify a current battery charge state as being below a threshold battery charge state and that the vehicle destination, as indicated in the parameters associated with the vehicle 110, has a vehicle charger, the battery tracking module 153 can determine that no reservation for the vehicle charger 120 needs to be generated. For instance, if the destination is labeled as "HOME" and/or other locations where a vehicle charger is known to be located, the battery tracking module 153 may determine no reservation needs to be generated as the vehicle 110 can be charged upon reaching the destination.

In certain embodiments, the battery tracking module 153 can utilize parameters associated with the vehicle 110 to determine that the current battery charge state is above a threshold battery charge state, and thus, the vehicle 110 does not need to be charged. In such embodiments, no action would be taken to reserve the vehicle charger 120. However, if the battery tracking module 153 determines that the current battery charge state is above a threshold battery charge state and that the battery charge state will be below a threshold battery charge state before reaching a destination (e.g., as determined by the location tracking module 152), the battery tracking module 153 can determine a reservation for the vehicle charger 120 needs to be generated.

The utilization module 154 can utilize one or more parameters associated with the vehicle 110 and, for example, data 121 to determine availability of the vehicle charger 120 when one or more modules within the reservation control system 150 has determined that a reservation needs to be generated for the vehicle 110 at the vehicle charger 120. For example, once the reservation control system 150, or modules thereof, has determined that a reservation to the vehicle charger 120 needs to be generated, the utilization module 154 can identify if the vehicle charger 120 is available or unavailable. For example, the vehicle charger 120 may be identified as being in use, reserved, out of service, or the like.

In certain embodiments, if the utilization module 154 determines that the vehicle charger 120 is available at a time when the vehicle 110 will arrive at the vehicle charger 120, the utilization module 154 can determine that a reservation needs to be generated for the vehicle 110 at the vehicle charger 120. In certain other embodiments, if the utilization module 154 determines that the vehicle charger 120 is unavailable, the utilization module 154 can determine if the vehicle charger 120 will be available when the vehicle 110 arrives at the vehicle charger 120. In such embodiments, availability may be determined, for example, by identifying a distance of the vehicle 110 from the vehicle charger 120, and utilizing speed data from the vehicle 110 to determine whether, at a future time when the vehicle 110 arrives at the vehicle charger 120, the vehicle charger 120 will be available. If, for example, the utilization module 154 determines that, by the time the vehicle 110 reaches the vehicle charger 120, the vehicle charger 120 will be available, the utilization module 154 can determine that a reservation needs to be generated at the vehicle charger 120 for the vehicle 110.

In various embodiments, if the utilization module 154 determines that the vehicle charger will be unavailable when the vehicle 110 reaches the vehicle charger 120 (e.g., the vehicle charger 120 will still be in use or is in an out of service state), the utilization module 154 can identify if another vehicle charger 120 is available. In some embodiments, the utilization module 154 can identify another vehicle charger within the same vehicle charging station, or the utilization module 154 can identify another vehicle charger at a different vehicle charging station. After the utilization module 154 identifies an alternative vehicle charger, the utilization module 154 can determine that a reservation needs to be generated at the alternative vehicle charger.

Similarly, in various embodiments, the utilization module 154 may identify that the vehicle charger 120 is operating at a reduced rate of service. In certain embodiments, the vehicle charger 120 may be operating at a reduced rate of service, for example, when the vehicle charger 120 is unable to provide full power capacity to charge the vehicle 110. In some embodiments, the utilization module 154 may find an alternative vehicle charger 120 as described above. In certain embodiments, if no alternative vehicle charger 120 is available, the utilization module 154 may generate a reservation at the vehicle charger 120 that is operating at the reduced rate of service. In such embodiments, the reservation control system 150 may alert a user indicating that the vehicle charger 120 is operating at a reduced rate of service when a reservation is made.

In certain embodiments, the utilization module 154 can determine a ranking of a reservation for the vehicle charger 120 when more than one vehicle 110 (e.g., vehicle 110-1, 110-2, 110-3 . . . 110-N) needs a reservation generated at the vehicle charger 120 at the same time. In such embodiments, the reservation control system 150, and/or each module thereof, may be utilized for each of vehicles 110-1 to 110-N, as previously described for a single vehicle 110. Accordingly, in certain embodiments, the utilization module 154 can assign a ranking to each of the vehicles 110 based on a corresponding set of vehicle parameters.

In certain embodiments, for example, vehicle 110-1 (or other vehicle, e.g., vehicle 110-2, 110-3, or 110-N) can receive a top ranking when one or more conditions are met. For example, if the vehicle 110-1 has the shortest distance to the vehicle charger 120, top ranking may be assigned to the vehicle 110-1. Additionally or alternatively, if the vehicle 110-1 has a battery state that is below a threshold battery charge state or has the lowest charge, a top ranking may be assigned to the vehicle 110-1. Additionally or alternatively, if the vehicle 110-1 enters the geo-fence corresponding to the vehicle charger 120 before any other vehicle (e.g., vehicles 110-2, 110-3, or 110-N), a top ranking may be assigned to the vehicle 110-1. Any combination of these conditions above as well as other conditions based on the one or more parameters associated with the vehicles may be used for ranking vehicles.

In certain embodiments, after a ranking has been assigned, the utilization module 154 can determine that a reservation needs to be generated for the top-ranked vehicle and sends a reservation option (e.g., request for user input) to the vehicle. In certain embodiments, vehicles that are not assigned the top ranking enter a queue based on their respective rankings. The vehicles in the queue are then considered for reservations in the order of their rankings. In some embodiments, if there is a queue of vehicles, a notification can be sent to the vehicles in the queue indicating a corresponding queue status.

In certain embodiments, after the top ranked vehicle is determined and the reservation option is sent, the user of the vehicle 110 (e.g., via the smartphone 112a and/or the vehicle control unit 112b) and/or the computing device 140 can send an acceptance response to confirm the reservation or a rejection response to reject the reservation. In certain embodiments, the user of vehicle 110 may send an "ACCEPT" or "REJECT." In certain embodiments, if there is a queue of vehicles and the user of the top ranked vehicle rejects the reservation, a reservation option is sent to the next ranked user of a vehicle in the queue.

In certain embodiments, once the reservation option is accepted, the reservation module 155 generates a reservation at the vehicle charger 120. For example, the reservation module 155 can automatically generate a reservation at the vehicle charger 120 by sending information to the vehicle charger 120, that may include, without limitation, the unique identifier associated with the vehicle, a reservation start time, an estimated arrival time of the vehicle, a reservation end time, an estimated charge time for the vehicle, and combinations of the same and like. In some embodiments, the reservation module 155 can communicate, for example, via the API 151 to the vehicle 110, and/or the computing device 140 that a reservation has been generated. In certain embodiments, the communication can include an audio and/or visual alert to a user of the vehicle 110 (e.g., via the smartphone 112a and/or the vehicle control unit 112b) and/or the computing device 140.

In some embodiments, the reservation module 155 can receive a request from the user of the vehicle 110 (e.g., via the smartphone 112a and/or the vehicle control unit 112b) and/or the computing device 140 to generate a reservation without automatic determination. In this manner, a user is able to bypass automated systems and request and/or generate a reservation at the vehicle charger 120 without the automated use of the location tracking module 152, the battery tracking module 153, and/or the utilization module 154 if one or more modules within the reservation control system 150 (e.g., the utilization module 154) have determined that the vehicle charger 120 is available. In various embodiments, the vehicle 110 may have more than one user (e.g., multiple drivers and/or passengers), and a primary user (e.g., the primary driver) may authorize one or more other users (e.g., secondary drivers and/or passengers) to request a reservation at the charger 120 for the vehicle 110. As such, in certain embodiments, the reservation module 155 may receive a request from the primary user or from one or more authorized users of the vehicle 110 (e.g., via the smartphone 112a and/or the vehicle control unit 112b). For example, a primary user may designate one or more authorized users via a smartphone 112a or other device, and the one or more authorized users may then request a reservation at the charger 120 via their own smartphone 112a or other device. In certain embodiments, the one or more authorized users can request a reservation at the charger 120, and the primary user (e.g., the driver) may send an acceptance response to confirm the reservation or a rejection response to reject the reservation via the vehicle control unit 112b.

In certain embodiments, after a reservation has been generated, the location tracking module 152 can send location data of the vehicle charger 120 to the vehicle 110 and/or the computing device 140. In various embodiments, the vehicle 110 and/or the computing device 140 may be automatically programmed with directions to the vehicle charger 120 using, for example, GPS coordinates or a physical address. In some embodiments, if the vehicle 110 (or other device/vehicle with a reservation) is identified by the location tracking module 152 as changing the destination away from the vehicle charger 120 after a reservation has been created, location tracking module 152 can invoke the reservation module 155 to cancel the reservation.

It should be noted that while each module of the reservation control system 150 can determine if a reservation for the vehicle 110 needs to be generated independently, each module within the reservation control system 150 can work in parallel or in tandem with other modules within the reservation control system 150 to determine if a reservation for the vehicle charger 120 needs to be generated. As such, each module within the reservation control system 150 can independently, or in combination, determine if a reservation needs to be generated. Additionally, while the reservation control system 150 was described relative to FIG. 1A as including the API 151, the location tracking module 152, the battery tracking module 153, the utilization module 154, and the reservation module 155, in certain embodiments, the above described modules may be expanded into more modules, or reduced into fewer modules. In such embodiments, each module of the reservation control system 150 may be expanded into multiple modules or confined to fewer modules without deviating from the scope of the disclosure. Additionally, while FIG. 1A was described relative to a single reservation control system, the reservation control system 150 may be expanded into multiple controls systems and/or a plurality of control systems without deviating from the scope of the disclosure.

Figure 1B:
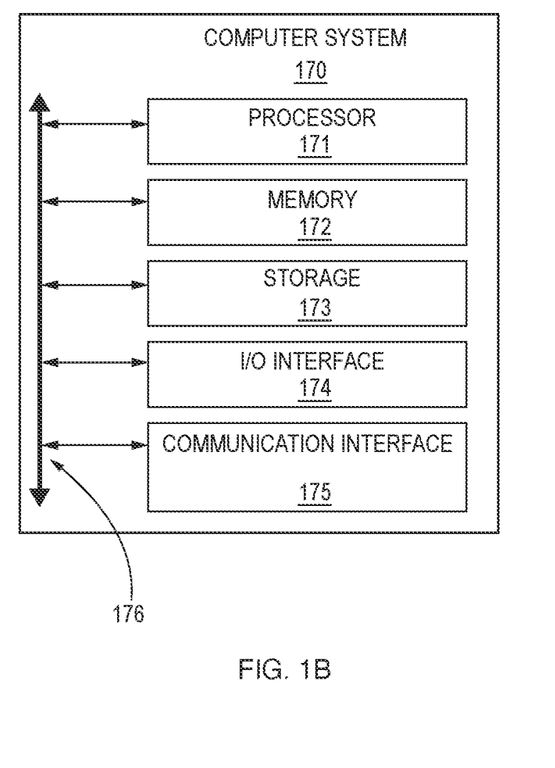
FIG. 1B illustrates an example computer system, according to certain aspects of the disclosure.

FIG. 1B illustrates an example computer system 170. Computer system 170 may include a processor 171, memory 172, storage 173, an input/output (I/O) interface 174, a communication interface 175, and a bus 176. Although this disclosure describes one example computer system including specified components in a particular arrangement, this disclosure contemplates any suitable computer system with any suitable number of any suitable components in any suitable arrangement.

As an example and not by way of limitation, computer system 170 may be an ECU, an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 170 may include one or more computer systems 170; be unitary or distributed, span multiple locations, machines, or data centers; or reside in a cloud, which may include one or more cloud components in one or more networks. Where appropriate, computer system(s) 170 may perform, at different times or at different locations, in real time or in batch mode, one or more steps of one or more methods described or illustrated herein.

Processor 171 may include hardware for executing instructions, such as those making up a computer program. As an example and not by way of limitation, to execute instructions, processor 171 may retrieve (or fetch) the instructions from an internal register, an internal cache, memory 172, or storage 173; decode and execute them; and then write one or more results to an internal register, an internal cache, memory 172, or storage 173. Processor 171 may include one or more internal caches for data, instructions, or addresses.

In particular embodiments, memory 172 includes main memory for storing instructions for processor 171 to execute or data for processor 171 to operate on. In particular embodiments, one or more memory management units (MMUs) reside between processor 171 and memory 172 and facilitate accesses to memory 172 requested by processor 171. In particular embodiments, memory 172 includes random access memory (RAM). This disclosure contemplates any suitable RAM.

In particular embodiments, storage 173 includes mass storage for data or instructions. As an example and not by way of limitation, storage 173 may include a removable disk drive, flash memory, an optical disc, a magneto-optical disc, magnetic tape, or a Universal Serial Bus (USB) drive or two or more of these. Storage 173 may include removable or fixed media and may be internal or external to computer system 170. Storage 173 may include any suitable form of non-volatile, solid-state memory or read-only memory (ROM).

In particular embodiments, I/O interface 174 includes hardware, software, or both, providing one or more interfaces for communication between computer system 170 and one or more input and/or output (I/O) devices. Computer system 170 may be communicably connected to one or more of these I/O devices, which may be incorporated into, plugged into, paired with, or otherwise communicably connected to vehicle 110 (e.g., through the TCM ECU). An input device may include any suitable device for converting volitional user input into digital signals that may be processed by computer system 170, such as, by way of example and not limitation, a steering wheel, a touch screen, a microphone, a joystick, a scroll wheel, a button, a toggle, a switch, a dial, or a pedal. An input device may include one or more sensors for capturing different types of information. An output device may include devices designed to receive digital signals from computer system 170 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 174 for them. I/O interface 174 may include one or more I/O interfaces 174, where appropriate.

In particular embodiments, communication interface 175 includes hardware, software, or both providing one or more interfaces for data communication between computer system 170 and one or more other computer systems 170 or one or more networks. Communication interface 175 may include one or more interfaces to a controller area network (CAN) or to a local interconnect network (LIN). Communication interface 175 may include one or more of a serial peripheral interface (SPI) or an isolated serial peripheral interface (isoSPI). In some embodiments, communication interface 175 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 176 includes hardware, software, or both coupling components of computer system 170 to each other. Bus 176 may include any suitable bus, as well as one or more buses 176, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 1C:
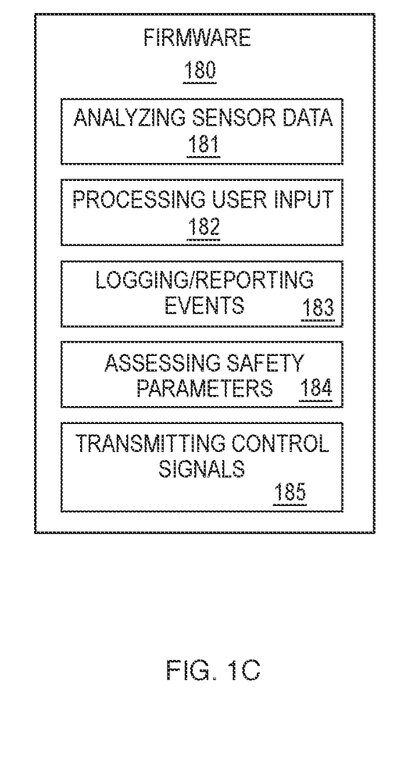
FIG. 1C illustrates example firmware for an Electronic Control Unit (ECU) of a vehicle, according to certain aspects of the disclosure.

FIG. 1C illustrates example firmware 180 for a vehicle ECU. Firmware 180 may include functions 181 for analyzing sensor data based on signals received from sensors received through communication interface 175. Firmware 180 may include functions 182 for processing user input (e.g., directly provided by a driver of or passenger in vehicle 110 or provided through the computing device 112) received through I/O interface 174. Firmware 180 may include functions 183 for logging detected events (which may be stored in storage 173 or uploaded to a remote server), as well as functions for reporting detected events (e.g., to a driver or passenger of the vehicle through an instrument display or interactive interface of the vehicle, or to a vehicle manufacturer, service provider, or third party through communication interface 175). Firmware 180 may include functions 184 for assessing safety parameters (e.g., monitoring the temperature of a vehicle battery or the distance between vehicle 110 and nearby vehicles). Firmware 180 may include functions 185 for transmitting control signals to components of vehicle 110, including other vehicle ECUs.

Figure 2:
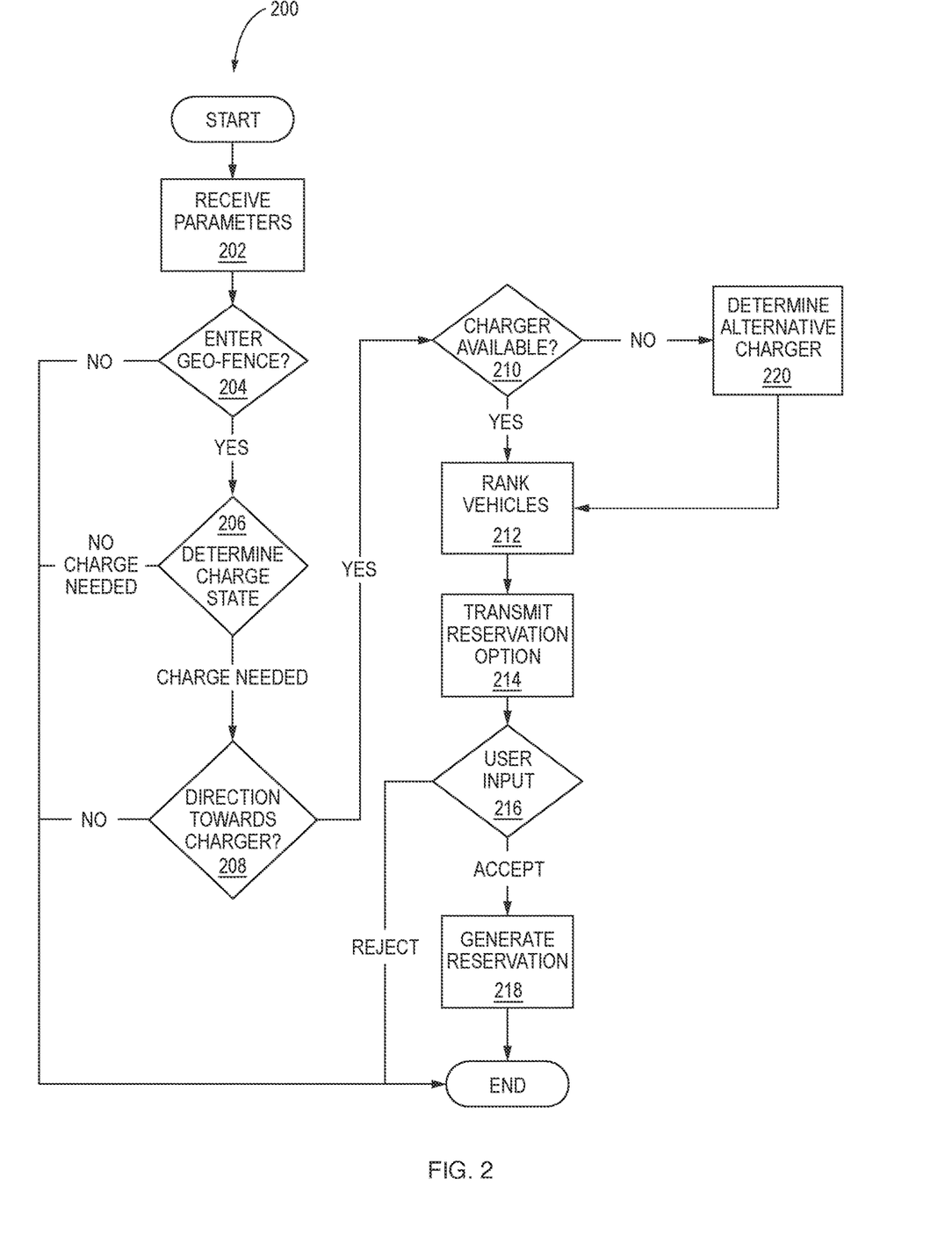
FIG. 2 illustrates a flowchart of a method for generating a reservation for a vehicle charger, according to certain aspects of the disclosure.

FIG. 2 illustrates an example method 200 for generating a reservation for a vehicle (e.g., vehicle 110) at a vehicle charger (e.g., vehicle charger 120) using various vehicle and vehicle charger data. In certain embodiments, the method 200 is performed by one or more components within the vehicle charger reservation system 100, as described above relative to FIG. 1A. For clarity, with respect to method 200, the vehicle 110 could be any one of vehicles 110-1 through 110-N.

At step 202, one or more parameters associated with the vehicle 110 are received, as described above relative to FIG. 1A. For example, the reservation control system 150 receives one or more parameters associated with the vehicle 110. In certain embodiments, the one or more parameters may include a unique identifier associated with the vehicle 110, a location of the vehicle 100, a direction of travel associated with the vehicle 100, a battery charge state of the vehicle 100, a destination of the vehicle 110, and/or a speed of the vehicle 110.

At step 204, a determination is made as to whether or not the vehicle 110 has entered a geo-fence of the vehicle charger 120 based on data related to the vehicle charger 120, as described above relative to FIG. 1A. For example, the location tracking module 152 of the reservation control system 150 determines whether the vehicle 110 has entered a geo-fence of the vehicle charger 120. In certain embodiments, data associated with the vehicle charger 120 (e.g., identifying information, such as, a type of charger, a location, a geo-fence of the vehicle charger 120, and/or utilization parameters of the vehicle charger 120) may be utilized in combination with the one or more parameters to determine if a reservation needs to be generated. In certain embodiments, once the location tracking module 152 has determined that the vehicle 110 has entered the geo-fence of the vehicle charger 120, the method 200 proceeds to step 206. If not, the method 200 ends, and no reservation is generated.

Additionally or alternatively, the location tracking module 152 determines whether or not the vehicle 110 is within a threshold distance from the vehicle charger 120, as described above relative to FIG. 1A. If yes, the method 200 proceeds to step 206. If not, the method 200 ends, and no reservation is generated.

At step 206, a determination is made with respect to a battery charge state of the vehicle 110, as described above relative to FIG. 1A. For example, if the battery tracking module 153 determines that a current battery charge state of the vehicle 110 is below a threshold level, indicating that the vehicle 110 needs to be charged, the method proceeds to step 208. In some embodiments, the battery tracking module 153 can determine an estimated battery charge state of the vehicle 110 based on the current battery charge state of the vehicle 110 and a destination of the vehicle 110 (e.g., as determined by the location tracking module 152).

For example, if the one or more parameters identify a current battery charge state as being below a threshold battery charge state and that the vehicle destination has a vehicle charger, the battery tracking module 153 can determine that no reservation for the vehicle charger 120 needs to be generated. In certain embodiments, no reservation for the vehicle 110 needs to be generated if, for example, the battery tracking module 153 identifies that it can arrive at the destination without needing to be charged.

In certain embodiments, the battery tracking module 153 can utilize the one or more parameters to determine that the current battery charge state is above a threshold battery charge state, and thus, the vehicle 110 does not need a charge. However, if the battery tracking module 153 determines that the current battery charge state is above a threshold battery charge state and that the battery charge state will be below a threshold battery charge state before reaching a destination, the battery tracking module 153 can determine a reservation for the vehicle charger 120 needs to be generated, and the method proceeds to step 208.

At step 208, a determination is made as to whether or not the vehicle 110 is headed in a direction towards the vehicle charger 120 based on the one or more parameters. For example, the location tracking module 152 determines whether or not the vehicle 110 is headed in a direction towards the vehicle charger 120. If yes, the method 200 proceeds to step 210. If not, the method 200 ends and no reservation is generated.

At step 210, a determination is made if the vehicle charger 120 is available, as described above relative to FIG. 1A. For example, the utilization module 154 can determine if the vehicle charger 120 is available or unavailable (or operating at a reduced rate of service). If yes, the method 200 proceeds to step 212. If not, the method 200 proceeds to step 220.

In certain embodiments, a time for the vehicle 110 to reach the vehicle charger 120 is calculated, based on which, a determination is made as to whether or not the vehicle charger 120 will be available when the vehicle 110 arrives at the vehicle charger 120, as described above relative to FIG. 1A. For example, the utilization module 154 may determine, based on the calculated time for the vehicle 110 to reach the vehicle charger 120, that the vehicle charger 120 will be available, in which case the method 200 proceeds to step 212. However, if the utilization module 154 determines that the vehicle charger 120 will not be available, the method 200 proceeds to step 220.

At step 220, an alternative vehicle charger is determined for the vehicle, as described above relative to FIG. 1A. For example, if the utilization module 154 determines that the vehicle charger 120 will be unavailable or is operating at a reduced rate of service when the vehicle 110 reaches the vehicle charger 120 (e.g., the vehicle charger 120 will still be in use or is in an out of service state) at step 1024, the utilization module 154 can identify if another vehicle charger is available. In some embodiments, the utilization module 154 can identify another vehicle charger within the same vehicle charging station or a different vehicle charging station. After the utilization module 154 identifies an alternative vehicle charger the method 200 proceeds to step 212. In certain embodiments, if no alternative vehicle charger is found, the method 200 ends, and no reservation is generated. In some embodiments, if no alternative vehicle charger is found, the vehicle can be placed in a queue and, upon a charger becoming available, the method 200 may proceed to the next steps.

At step 212, responsive to a determination that the vehicle needs a reservation, a ranking is determined for the vehicle 110 relative to other vehicles, as described above relative to FIG. 1A. In particular, reservation control system 150 may have similarly determined that one or more other vehicles require charging reservations by, for example, performing steps 202-210 and 220 for each of the other vehicles. In such an example, the utilization module 154 may assign a ranking to each of the vehicles (e.g., vehicles 110-1 through 110-N based on a corresponding set of one or more parameters for each vehicle. In certain embodiments, the utilization module 154 assigns a top ranking based on the rankings for each corresponding vehicle, as described above relative to FIG. 1A.

In certain embodiments, after ranking top ranking has been assigned, method 200 proceeds to step 214. In some embodiments, vehicles that did not receive the top ranking are placed in a queue based on corresponding rankings. In some embodiments, step 212 can be omitted if there are as many or more charges available than vehicles requiring reservations.

At step 214, a reservation option is transmitted to a user of the vehicle 110 for the vehicle charger 120, as described above relative to FIG. 1A. In certain embodiments, the reservation option is transmitted to the vehicle that was top ranked in step 212, while vehicles that were not top ranked in step 212 may receive a notification indicating that the vehicle has been placed in the queue. In certain embodiments, as subsequent vehicle chargers become available, reservations options may be transmitted to the next users in the queue.

At step 216, the user of the vehicle provides input responsive to the transmission of the reservation option. The reservation option may then be accepted by user, in which case the method 200 proceeds to step 218, or rejected, in which case the method 200 ends, and no reservation is generated. In certain embodiments, if the user of the vehicle declines a reservation, the method proceeds back to step 214 for the next vehicle in line in the queue. In certain embodiments, the user of the vehicle 110 (e.g., via the smartphone 112*a* and/or the vehicle control unit 112*b*) and/or the computing device 140 can send an acceptance response to confirm the reservation or a rejection response to reject the reservation. For example, the user may send an "ACCEPT" or "REJECT" via the smartphone 112*a*, the vehicle control unit 112*b*, and/or the computing device 140.

At step 218, a reservation is generated for the vehicle at the vehicle charger 120 (e.g., automatically, without user intervention), as described above relative to FIG. 1A. In certain embodiments, after a reservation has been generated, the reservation control system 150 can send location data of the vehicle charger 120 to the vehicle 110. In various embodiments, the vehicle 110 may be automatically programmed with directions to the vehicle charger 120 using, for example, GPS coordinates or a physical address. In various embodiments, the reservation control system 150 can cancel a generated reservation (e.g., via the reservation module 155) if conditions have changed with respect to determinations made within the method 200.

In some embodiments, a unique identifier associated with the vehicle 110 is sent to the vehicle charger 120 to hold the reservation for the vehicle. If the vehicle for which the reservation was made uses the vehicle charger 120, reservation control system 150 causes the vehicle charger 120 to charge the vehicle. The reservation control system 150 can verify whether the vehicle matches the reservation based on, for example, the vehicle's unique identifier or other mechanisms. The reservation control system 150 causing the vehicle charger 120 to charge the vehicle may include the reservation control system 150 sending a command to a control system associated with the charging station to enable charging at the vehicle charger 120, or directly enabling charging at the vehicle charger 120, for example, when the reservation control system 150 is part of or integrated into the control system associated with the charging station.

However, if a user of a vehicle for which the reservation is not made plugs their vehicle charger 120's connector into the charging port of their vehicle, the reservation control system 150 can, for example, verify the vehicle's unique identifier and determine that the user's vehicle does not match the reservation. In such an example, the reservation control system 150 may cause the vehicle charger 120 to not charge the user's vehicle until the reservation is cancelled. For example, if after a duration of time (e.g., 1 hour) the vehicle for which the reservation was made does not utilize the vehicle charger 120, the reservation control system 150 can cancel the reservation and make it available to the vehicle attempting to use the charger.

Figure 3:
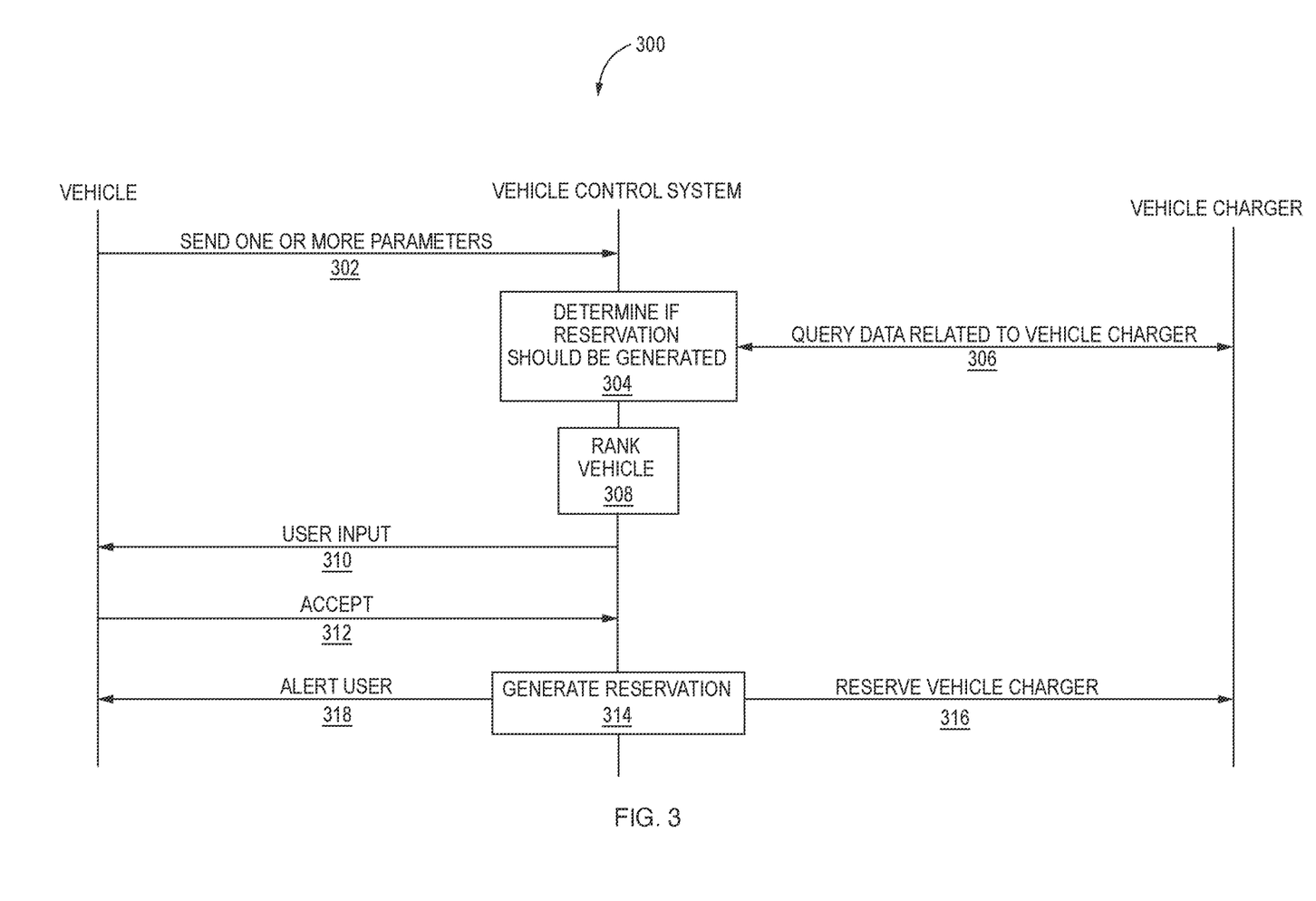
FIG. 3 illustrates a sequence diagram for generating a reservation for a vehicle at a vehicle charger, according to certain aspects of the disclosure.

FIG. 3 illustrates an example sequence diagram 300 for generating a reservation for a vehicle (e.g., vehicle 110) at a vehicle charger (e.g., vehicle charger 120). In certain embodiments, the reservation is generated by one or more components within the vehicle charger reservation system 100. In such embodiments, one or more modules of the reservation control system 150 can generate a reservation for vehicle 110 at vehicle charger 120 after a determination is made that the vehicle 110 needs a reservation at the vehicle charger 120.

At step 302, the vehicle 110 (e.g., via the smartphone 112a and/or the vehicle control unit 112b) and/or the computing device 140 sends one or more parameters associated with the vehicle 110 to the reservation control system 150, as described above with respect to FIG. 1A. At step 304, a determination is made by the reservation control system 150 based on the one or more parameters, as described above with respect to FIG. 1A. As shown in FIG. 3, in certain embodiments, the reservation control system 150 queries the vehicle charger 120 (step 306) to receive data associated with the vehicle charger 120 to be utilized in combination with the one or more parameters to determine if a reservation needs to be generated.

After the reservation control system 150 determines the vehicle 110 needs a reservation at the vehicle charger 120, the reservation control system 150 ranks the vehicle 110 with respect to other vehicles needing a reservation (e.g., one or more of vehicles 110-1, 110-2, 110-3 . . . 110-N), as described above with respect to FIG. 1A (step 308). After a top ranking is assigned to the vehicle 110, the reservation control system sends a request for user input (step 310) to the vehicle 110, as described above with respect to FIG. 1A. In some embodiments, step 308 can be omitted if there are as many or more chargers available than vehicles requiring reservations.

At step 312, the user of the vehicle 110 sends an acceptance for the reservation to the reservation control system 150, as described above with respect to FIG. 1A. At step 314, the reservation control system generates a reservation (e.g., automatically, without user intervention), as described above with respect to FIG. 1A. At step 316, the reservation is sent to the vehicle charger 120, as described above with respect to FIG. 1A. For example, the reservation module 155 can generate a reservation at the vehicle charger 120 by sending information to the vehicle charger 120, that may include, without limitation, the unique identifier associated with the vehicle, a reservation start time, an estimated arrival time of the vehicle, a reservation end time, an estimated charge time for the vehicle, and combinations of the same and like.

At step 318, an alert is sent to the user of the vehicle 110 that a reservation has been made, as described above with respect to FIG. 1A. In certain embodiments, the alert may include an audio and/or visual alert to a user of the vehicle 110 (e.g., via the smartphone 112a and/or the vehicle control unit 112b) and/or the computing device 140. In certain embodiments, the alert may include a confirmation to a user of the vehicle 110 (e.g., via the smartphone 112a and/or the vehicle control unit 112b) and/or the computing device 140. Additionally, in certain embodiments, the alert to the user of the vehicle 110 may additionally include GPS data to route the vehicle 110 to the vehicle charger 120.

If the vehicle for which the reservation was made uses the vehicle charger 120, reservation control system 150 causes the vehicle charger 120 to charge the vehicle. The reservation control system 150 causing the vehicle charger 120 to charge the vehicle may include reservation control system 150 sending a command to a control system associated with the charging station to enable charging at the vehicle charger 120, or directly enabling charging at the vehicle charger 120, for example, when the reservation control system 150 is part of integrated into the control system associated with the charging station.

In some embodiments, a unique identifier associated with the vehicle is sent to the vehicle charger 120 to hold the reservation for the vehicle 110 such that no other vehicles can utilize the vehicle charger 120. In certain embodiments, the vehicle charger 120 can be held starting from the reservation start time and ending at the reservation end time. In certain embodiments, the vehicle charger 120 can be held starting from the estimated arrival time of the vehicle and ending when the vehicle is charged. In certain embodiments, the vehicle charger 120 can be held for a predetermined time if the vehicle 100 fails to arrive at the vehicle charger 120. For example, the predetermined time can start at the estimated arrival time of the vehicle and end after the estimated charge time for the vehicle. In certain embodiments, the vehicle charger 120 becomes available when a user cancels the reservation.

In certain embodiments, various steps of sequence diagram 300 may be performed in any manner as outlined above with respect to FIGS. 1A and 2, utilizing one or more of the vehicle 110, the vehicle charger 120, the computing device 140, the reservation control system 150, and/or any modules within the reservation control system 150.

While method 200 and sequence diagram 300 are described with various modules performing sequential steps, it is to be understood that any component within the vehicle charger reservation system 100 can perform any of the foregoing steps in various sequences, in tandem, and/or in parallel, and may be performed in real-time and/or at specific time intervals (e.g., every 5, 10, 15, 20, 30, 45, or 60 minutes). In certain embodiments, various steps within the method 200 and sequence diagram 300 can be omitted. Additionally, method 200 and sequence diagram 300 can be performed for a single vehicle 110 (e.g., vehicle 110-1) or for a plurality of vehicles 110-N (e.g., vehicle 110-1, 110-2, 110-3 ... 110-N), and each step and/or processes of can be performed as outlined above with respect to FIG. 1A.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of vehicle charging, comprising, by a control system in communication with a device associated with a vehicle:
   receiving, from the device, a first set of one or more vehicle parameters associated with the vehicle, the first set of one or more vehicle parameters comprising first global positioning system (GPS) coordinates from a GPS sensor associated with the vehicle;
   determining, based on the first GPS coordinates, that the vehicle has entered a first geo-fence corresponding to a first vehicle charger;
   responsive to the determining, generating, for the vehicle, a first reservation for the first vehicle charger;
   receiving, from the device, a second set of one more vehicle parameters associated with the vehicle, the second set of one or more vehicle parameters comprising second GPS coordinates from the GPS sensor associated with the vehicle;
   identifying, based on the second GPS coordinates, that the vehicle has exited the first geo-fence corresponding to the first vehicle charger;
   responsive to the identifying, automatically cancelling the first reservation for the first vehicle charger, thereby making the first vehicle charger available for use by one or more other vehicles;
   responsive to the automatically cancelling, determining, based on a location of a second vehicle charger, a current power capacity of the second vehicle charger, and the one or more vehicle parameters, that a second reservation should be generated for the second vehicle charger;
   generating, for the vehicle, the second reservation for the second vehicle charger; and
   causing the second vehicle charger to charge the vehicle based on the second reservation.

2. The method of claim 1, wherein the first set of one or more vehicle parameters further comprise at least one of a unique identifier associated with the vehicle, a distance from the vehicle to the first vehicle charger, a direction of travel associated with the vehicle, or a battery charge state of the vehicle.

3. The method of claim 1, wherein the determining that the second reservation should be generated for the second vehicle charger comprises at least one of:
   determining that the vehicle has entered a second geo-fence corresponding to the second vehicle charger; or
   determining that the vehicle is within a threshold distance of the second vehicle charger.

4. The method of claim 1, wherein the device associated with the vehicle comprises at least one of a computing device onboard the vehicle or a vehicle control unit.

5. The method of claim 1, wherein the first set of one or more vehicle parameters further comprise a battery charge state of the vehicle, and the generating of the first reservation is further responsive to a determination that that the battery charge state of the vehicle is below a threshold level.

6. The method of claim 1, wherein the generating the first reservation for the first vehicle charger comprises transmitting a reservation option to the vehicle device, and further comprising at least one of:
    receiving a user acceptance of the reservation option; or
    receiving a user rejection of the reservation option.

7. The method of claim 1, wherein the determining that the second reservation should be generated for the second vehicle charger comprises:
    identifying that at least one vehicle charger is currently operating at a reduced power capacity; and
    responsive to the identifying, determining that the second vehicle charger is currently operating at a greater power capacity than the at least one vehicle charger.

8. The method of claim 1, wherein the determining that the second reservation should be generated for the second vehicle charger comprises:
    determining that the second vehicle charger is currently unavailable;
    calculating a time period for the vehicle to reach the second vehicle charger; and
    determining, based on the time period, that the second vehicle charger will become available within a threshold time of the vehicle arriving at the second vehicle charger.

9. The method of claim 1, wherein the determining that the second reservation should be generated for the second vehicle charger comprises:
    determining that at least one vehicle charger is currently unavailable;
    calculating a time period for the vehicle to reach the at least one vehicle charger; and
    based on determining that the at least one vehicle charger will not become available within a threshold time, determining to reserve the second vehicle charger.

10. The method of claim 1, wherein the determining that the second reservation should be generated for the second vehicle charger comprises determining that the second vehicle charger is currently operating at full power capacity.

11. The method of claim 1, further comprising assigning a ranking to each of a plurality of vehicles based on a corresponding set of vehicle parameters associated with each vehicle included in the plurality of vehicles, wherein a top ranking is assigned to the vehicle based on at least one of:
    the vehicle being a shortest distance from the second vehicle charger;
    the vehicle having a battery charge state that is below a threshold battery charge state; or
    the vehicle entering a geo-fence corresponding to the second vehicle charger before any other vehicle included in the plurality of vehicles.

12. A control system for vehicle charging, comprising:
    a memory;
    at least one processor coupled to the memory and configured to:
        receive, from a device associated with a vehicle, a first set of one or more vehicle parameters associated with the vehicle, the first set of one or more vehicle parameters comprising first global positioning system (GPS) coordinates from a GPS sensor associated with the vehicle;
        determine, based on the first GPS coordinates, that the vehicle has entered a first geo-fence corresponding to a first vehicle charger;
        responsive to the determining, generate, for the vehicle, a first reservation for the first vehicle charger;
        receive, from the device, a second set of one more vehicle parameters associated with the vehicle, the second set of one or more vehicle parameters comprising second GPS coordinates from the GPS sensor associated with the vehicle;
        identify, based on the second GPS coordinates, that the vehicle has exited the first geo-fence corresponding to the first vehicle charger;
        responsive to the identifying, automatically cancel the first reservation for the first vehicle charger, thereby making the first vehicle charger available for use by one or more other vehicles;
        responsive to the automatically cancelling, determine, based on a location of a second vehicle charger, a current power capacity of the second vehicle charger, and the one or more vehicle parameters, that a second reservation should be generated for the second vehicle charger;
        generate, for the vehicle, the second reservation for the second vehicle charger; and
        cause the second vehicle charger to charge the vehicle based on the second reservation.

13. The control system of claim 12, wherein the first set of one or more vehicle parameters further comprise at least one of a unique identifier associated with the vehicle, a distance from the vehicle to the first vehicle charger, a direction of travel associated with the vehicle, or a battery charge state of the vehicle.

14. The control system of claim 12, wherein the determining that the second reservation should be generated for the second vehicle charger comprises at least one of:
    determining that the vehicle has entered a second geo-fence corresponding to the second vehicle charger; or
    determining that the vehicle is within a threshold distance of the second vehicle charger.

15. The control system of claim 14, wherein the device associated with the vehicle comprises at least one of a computing device onboard the vehicle or a vehicle control unit.

16. The control system of claim 14, wherein the first set of one or more vehicle parameters further comprise a battery charge state of the vehicle, and the generating of the first reservation is further responsive to a determination that that the battery charge state of the vehicle is below a threshold level.

17. The control system of claim 12, wherein the generating the first reservation for the first vehicle charger comprises transmitting a reservation option to the device, and further comprising at least one of:
    receiving a user acceptance of the reservation option; or
    receiving a user rejection of the reservation option.

18. The control system of claim 12, wherein the determining that the second reservation should be generated for the second vehicle charger comprises:
    identifying that at least one vehicle charger is currently operating at a reduced power capacity; and
    responsive to the identifying, determining that the second vehicle charger is currently operating at a greater power capacity than the at least one vehicle charger.

19. The control system of claim 12, wherein the determining that the second reservation should be generated for the second vehicle charger comprises:
- determining that at least one vehicle charger is currently unavailable;
- calculating a time period for the vehicle to reach the at least one vehicle charger; and
- determining, based on the time period, whether the at least one vehicle charger will become available within a threshold time of the vehicle arriving at the at least one vehicle charger; and
- based on determining that the at least one vehicle charger will not become available within the threshold time, determining to reserve the second vehicle charger.

20. The control system of claim 12, wherein the processor is further configured to assign a ranking to each of a plurality of vehicles based on a corresponding set of vehicle parameters associated with each vehicle included in the plurality of vehicles,
- wherein a top ranking is assigned to the vehicle based on at least one of:
  - the vehicle being a shortest distance from the second vehicle charger;
  - the vehicle having a battery charge state that is below a threshold battery charge state; or
  - the vehicle entering a geo-fence corresponding to the second vehicle charger before any other vehicle included in the plurality of vehicles.

* * * * *